Sept. 20, 1938. R. MALCOM 2,130,555
RESPIRATOR FILTER
Filed April 6, 1936
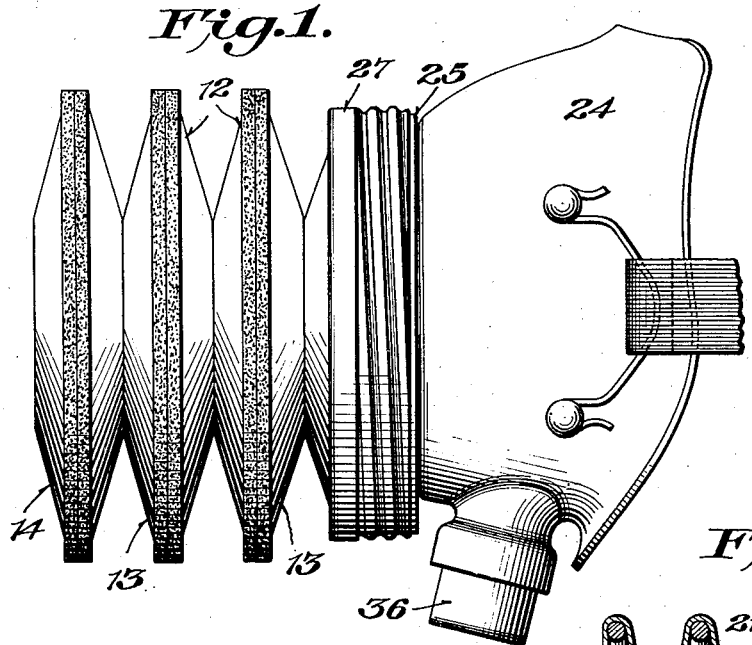
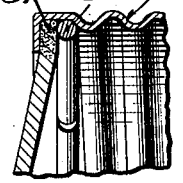
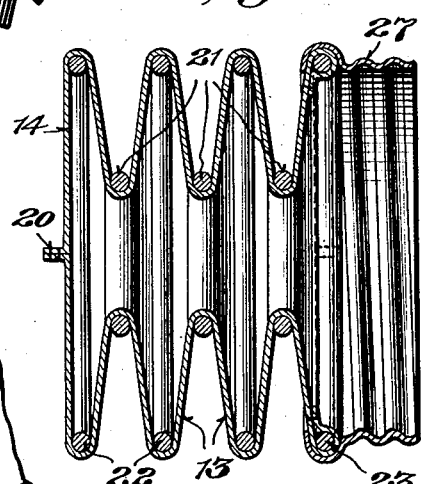
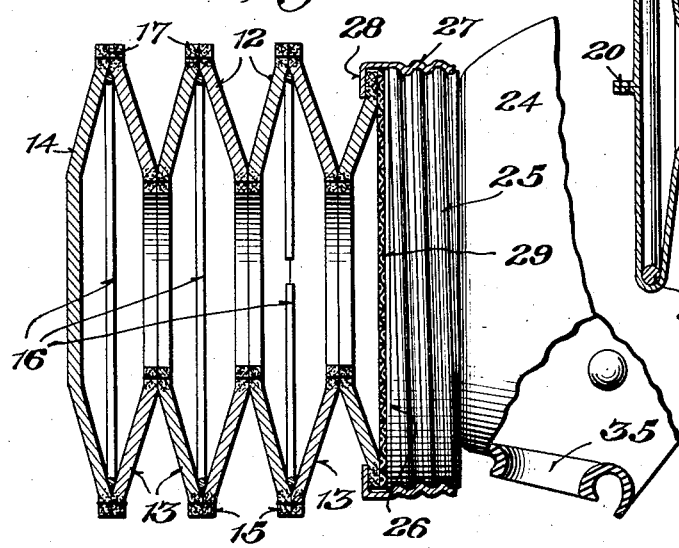
Inventor
Robert Malcom,
By Royal E. Burnham,
Attorney Patented Sept. 20, 1938

2,130,555

UNITED STATES PATENT OFFICE 2,130,555

RESPIRATOR FILTER

Robert Malcom, Chicago, Ill.

Application April 6, 1936, Serial No. 72,999

6 Claims. (Cl. 183—71)

This invention relates to respirators that have, or are associated with, means for preventing entrance of harmful and toxic dusts, fumes, mists, and other injurious matter in the atmosphere to the nasal passages of the user.

One of the objects of the invention is to provide a dust-filter unit of comparatively small diameter and length, which affords a large filtering area that permits easy breathing for a reasonable period in heavy concentrations of dust before becoming clogged.

Further, the filter unit of the invention is such that its filtering area may be increased, by addition of elements thereto, so that there is no limit, within the range of practical utility, to the filtering area that may be afforded.

More specifically, the unit, of generally tubular form, is made, in one type, with a plurality of bellows-like folds, of felt or other suitable filtering fabric, that present a large filtering area in any particular diameter and length of the unit.

In one form, the unit is made of a series of fabric pieces, with a comparatively large opening at the center of each, connected at their outer and inner edges, and an object is to provide means to keep the fabric taut and thus expose the maximum area for filtering at all times.

Other objects of the invention are explained in the more particular description hereinafter.

When considered with the description herein, the characteristics of the invention are apparent in the accompanying drawing, forming part hereof, wherein embodiments of the invention are disclosed, for purposes of illustration.

Like reference-characters refer to corresponding parts in the views of the drawing, of which—

Fig. 1 is a side elevation;

Fig. 2 is a longitudinal section, part of the facepiece being in elevation;

Fig. 3 is a fragmentary section illustrative of a means of retaining the filter unit in the facepiece-cap;

Fig. 4 is a longitudinal section of another form of filter unit;

Fig. 5 is a fragmentary view of one of the filter-unit parts.

Referring to Figs. 1 and 2, the filter unit is made with pieces 12 of air-filtering fabric having comparatively large openings or passages at their centers, the pieces being preferably of disc form as shown. The pieces 12 are connected successively together at their outer and inner edges in zig-zag arrangement as bellows-like folds 13. The piece at one end of the series is connected at its outer edge to an end wall 14 of the same or like material that closes the outer end of the tubular unit. The piece 12 at the other end of the unit is connected at its inner edge only to the adjacent piece, and it is adapted for connection into a holding element as later described.

As seen in Figs. 1 and 2, the pieces 12 and closing wall 14 are connected at the edges by stitching 15. The filter fabric of the unit may be kept radially taut by internal expanding split rings 16 positioned in the bellows-like folds, whereby the unit is stiffened radially. In some instances, however, these rings may be omitted; and, in order to keep the fabric sufficiently taut, the edge portions of the folds may be stiffened by impregnation with any suitable stiffening material, as indicated at 17. This impregnation may be effected either before or after assembly of the elements of the unit.

The invention also provides a filter unit of a single piece of tubular material that is sufficiently pliable to permit its disposition into zigzag or bellows-like folds of a nature similar to those of the preceding forms, as shown by Fig. 4. This unit may be formed by gathering and sewing the material of the tube by stitching, as indicated at 20, to provide the closing wall 14, and by expanding and contracting the tube alternately at intervals, to present the bellows-like folds, by disposing it through external smaller rings 21 and outside of internal larger rings 22. The tube material at the end opposite to the closing wall is sewed or otherwise suitably attached to a split ring 23, for use in securing the unit to a facepiece member.

The rings 16, 21, 22, and 23 may be of lightweight metal, or of such light material as rattan, reed, or the like.

The filter unit, formed as it is with bellows-like folds, affords within any given length and diameter a much greater area of filtering surface than one of the same dimensions with flat or merely arcuate surfaces. The unit, of any given filtering area, is much shorter and more compact than those of ordinary form. Thus, within the range of practical utility, and with avoidance of being cumbersome and interfering with the activities of the wearer, the unit can be used longer before becoming clogged with dust.

The filter unit may be connected with the facepiece 24 of a respirator in any suitable manner; for example:

The facepiece has incorporated into its front an exteriorly threaded annular member 25, with its outer end edge constituting an annular abutment 26. This member takes an interiorly-threaded cap 27, having an inwardly-extending annular flange 28 that overlaps the abutment 26.

The fabric piece 12 at the open end of the filter units of the forms disclosed by Figs. 1 and 2 is of substantially the same diameter as the inner diameter of the cap. By bending the fabric disc, it is inserted into the cap. The cap then is screwed onto the member 25 until the abutment 26 presses against the disc, whereby the latter is held tightly against the flange 28. In order to retain the disc in the cap until the latter is screwed home, a wire screen 29 or other suitable member such as a split expanding ring 30 may be pressed by the fingers against the disc. Further, and irrespective of the screen and ring, this retention of the disc in the cap until the latter is screwed home may be insured by stiffening the edge portion of the disc, as indicated at 31, by impregnation with stiffening material.

With the form of filter unit illustrated by Fig. 4, the ring 23 to which the open end of the tube is attached is snapped into place in the cap and pressed against the flange 28, and thus the unit is held in the cap while the latter is being screwed on.

The intake-passage of the facepiece may be controlled by an intake-valve of conventional form (not shown), the valve being arranged to open and close, respectively, during inhalation and exhalation of the user of the respirator.

The facepiece below its intake has an exhaust-passage 35, into which is fitted tightly the casing 36 of an exhaust-valve structure.

What I claim as new, and desire to secure by Letters Patent, is—

1. A respirator air-filter unit comprising a series of bellows-like folds of filter fabric, a wall of like fabric closing one end of the unit, and an annular flaring piece stiffened at its edge connected at the other end and adapted to be inserted into a retaining member of a respirator facepiece.

2. A respirator air-filter unit comprising a series of bellows-like connected folds of filter fabric, and a wall of like fabric closing one end of the unit, the unit being adapted to be connected at the other end with the facepiece of a respirator, and some of said folds being inherently stiffened at their edges for the purpose specified.

3. A respirator air-filter unit comprising a series of pieces of filter fabric, each having an opening therethrough, connected successively together at their outer and inner edges and constituting bellows-like folds, a closing wall of like fabric connected to the piece at one end of the unit, the piece at the other end of the unit being free at its outer edge and adapted for connection with the facepiece of a respirator, and some of said pieces being inherently stiffened at their connected edges.

4. As a respirator air-filter, a somewhat elongated unit of filter fabric, the fabric at one end of the unit being a piece of radially-flaring annular form for insertion into a retaining member of a respirator facepiece, said annular piece being inherently stiffened at its edge for the purpose specified.

5. A respirator air filter unit comprising filter fabric disposed in annular bellows-like folds, the unit being adapted for connection at one end with the facepiece of a respirator, and at least one of said folds being inherently stiffened at its periphery.

6. In a respirator having a face-piece, an exteriorly threaded annular member thereon, an interiorly threaded cap turnable on to and off of said member having an inwardly extending annular flange overlapping the end of said member, and a filter unit having a flaring annular end piece clamped between said end and flange, said end piece being inherently stiffened at its periphery for the purpose specified.

ROBERT MALCOM.